United States Patent [19]

Mahl

[11] 3,998,347
[45] Dec. 21, 1976

[54] CREEP RESISTANT SEALING ARRANGEMENT FOR BELL JAR

[75] Inventor: Gunard O. B. Mahl, San Francisco, Calif.

[73] Assignee: CHA Industries, Menlo Park, Calif.

[22] Filed: Oct. 31, 1975

[21] Appl. No.: 627,505

[52] U.S. Cl. .............................. 215/1 R; 215/352; 220/69; 220/73; 220/82 R; 220/320; 220/378
[51] Int. Cl.² .................... B65D 1/10; B65D 23/00; B65D 45/32
[58] Field of Search ............ 220/69, 73, 82 R, 319, 220/320, 378, 85 K; 215/1 R, 341, 352; 248/362, 363; 23/292

[56] References Cited
FOREIGN PATENTS OR APPLICATIONS

| 329,918 | 9/1935 | Italy | 220/69 |
| 333,681 | 8/1930 | United Kingdom | 220/69 |

*Primary Examiner*—William Price
*Assistant Examiner*—Stephen Marcus
*Attorney, Agent, or Firm*—Phillips, Moore, Weissenberger, Lempio & Strabala

[57] ABSTRACT

The invention is concerned with an improved creep resistant sealing arrangement for a bell jar which is used in vacuum work. The bell jar generally consists of a closed top cylindrical container having an open bottom defining a planar rim. The rim generally seats against a flat surface with a gasket between the rim and the surface. A vacuum source communicates with the interior of the bell jar. The sealing arrangement of the present invention comprises a unitary resilient elastomeric ring having a generally J-shaped cross-section, an outer leg of which fits against the outside of the bell jar, an inner leg of which fits against the inside of the bell jar and a cross member of which fits against the rim of the bell jar. Also part of the sealing arrangement is means for fastening the outer leg radially against the outside of the bell jar. Such fastening means can comprise a metal band resembling an enlarged hose clamp, a tape fastening the outer leg to the outside of the bell jar, or an adhesive placed between the outer leg and the outside of the bell jar.

7 Claims, 5 Drawing Figures

U.S. Patent  Dec. 21, 1976  3,998,347
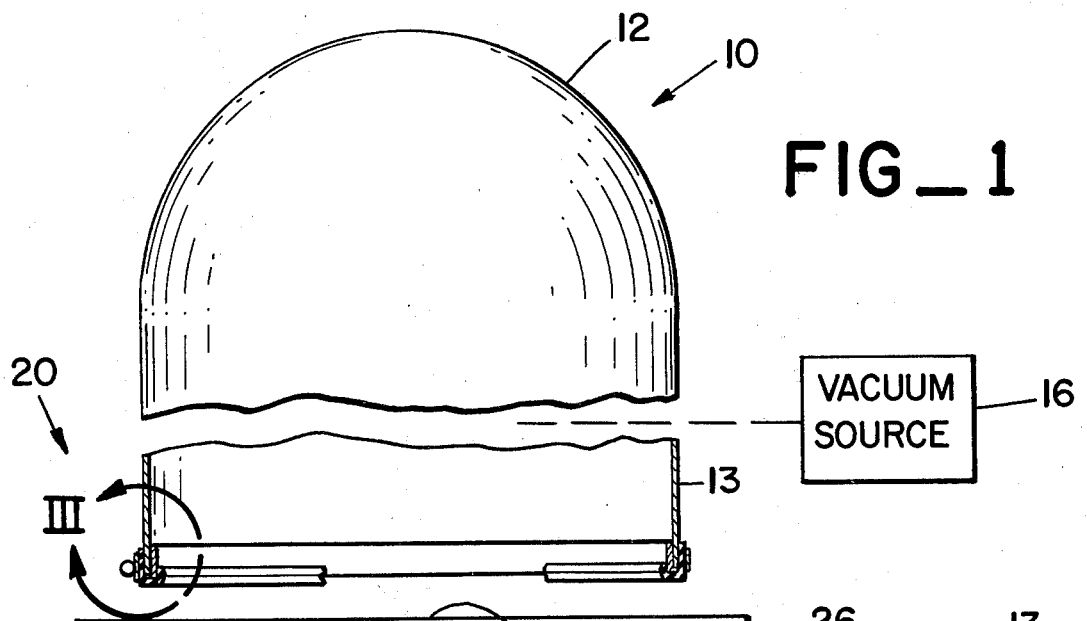
FIG_1
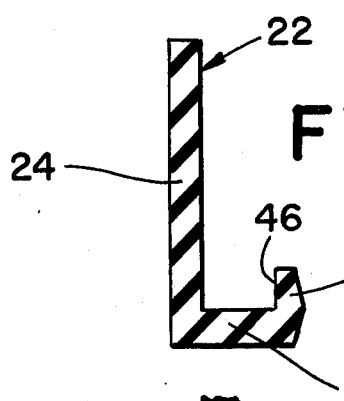
FIG_2
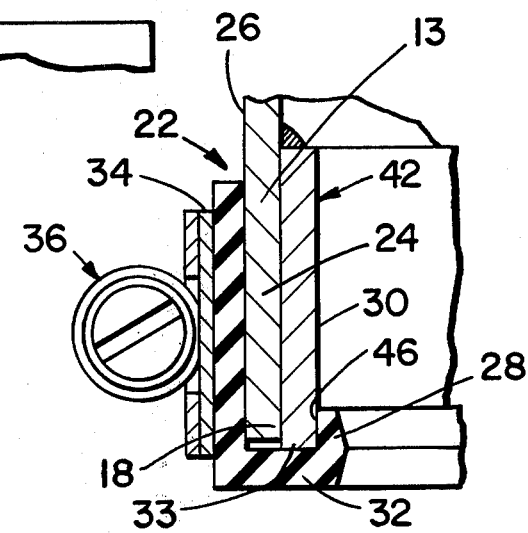
FIG_3
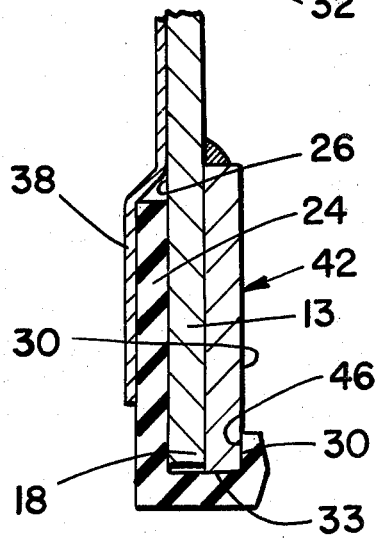
FIG_4
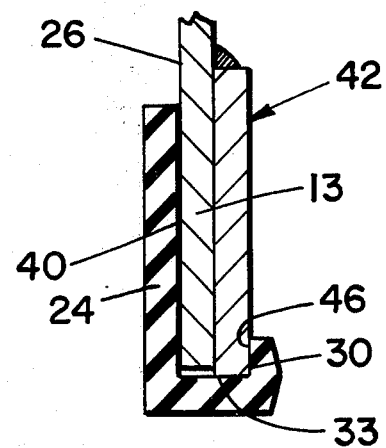
FIG_5

CREEP RESISTANT SEALING ARRANGEMENT FOR BELL JAR

BACKGROUND OF THE INVENTION

1. Field of the Invention

The invention is directed to an improvement in vacuum devices. More particularly the invention is directed to an improvement in bell jars which have an open bottom with a planar rim thereabout and which fit against a flat surface with a gasket between the planar rim and the surface. Such arrangements find particular application in vacuum deposition apparatus and in other vacuum manufacturing apparatus.

2. Prior Art

The prior art has used L-shaped elastomeric rings to seal the rim of a bell jar or the like to a flat surface. The term L-shaped ring is used to denote rings having an L-shaped cross-section. These L-shaped rings have generally been clamped in place with what amounts to oversized hose clamps or have occassionally been taped in place. One leg of the L-shaped rings has been clamped generally against the outside of the bell jar while the other generally shorter leg of the L-shaped ring has been in contact with the bottom rim of the bell jar. The hose clamp type arrangement has generally been placed around the longer leg of the L-shaped ring. The bell jar has then been propelled against a flat surface in the usual manner to ensure vacuum tight fit and the inside of the bell jar has been evacuated in a conventional manner.

A serious problem exists when such L-shaped rings are used to seal the bottoms of bell jars to flat surfaces. Most particularly, this problem consists of a creeping of the L-shaped ring upwardly within the hose clamp or tape and away from the bottom rim of the bell jar. This has required frequent replacement of bell jar sealing rings. The present invention provides a creep resistant sealing arrangement for bell jars and the like. Most particularly, this arrangement comprises a unitary resilient elastomeric ring having a generally J-shaped cross-section rather than a generally L-shaped cross-section. The arrangement further includes means for fastening the generally longer outer leg of the J-shaped ring inwardly against the outside of the bell jar. The inner generally shorter leg of the J-shaped ring serves to bind against the inside of the bell jar thus preventing the J-shaped ring from creeping out from under the fastening means which would generally comprise a metal band such as a large hose clamp or the like while keeping out-gassing of the J-shaped ring minimal. As a result of the significantly improved creep resistance of the sealing arrangement of the present invention, replacement of elastomeric rings, in the case of the present invention elastomeric rings having a J-shaped cross-section, is significantly reduced and down-time of the vacuum apparatus is also significantly reduced.

SUMMARY OF THE INVENTION

The invention is concerned with an improved creep resistant sealing arrangement in a vacuum device comprising a closed top cylindrical bell jar having an open bottom defining a planar rim, a flat surface against which the rim seats with a gasket therebetween and a vacuum source communicating with the interior of the bell jar. The improved creep resistant sealing arrangement comprises a unitary resilient elastomeric ring having a generally J-shaped cross-section, an outer leg of which fits against the outside of said bell jar, an inner leg of which fits against the inside of said bell jar and a cross member of which fits against the rim of said bell jar; and means for fastening said outer leg radially inwardly against the outside of the bell jar.

BRIEF DESCRIPTION OF THE DRAWING

The invention will be better understood by reference to the figures of the drawing wherein like numbers denote like parts throughout and wherein:

FIG. 1 illustrates in side elevational section view a vacuum device in accordance with the present invention and including the improved creep resistant sealing arrangement thereof;

FIG. 2 illustrates in section an enlarged elastomeric ring having a generally J-shaped cross-section;

FIG. 3 illustrates in section an enlarged view of area III of FIG. 1;

FIG. 4 illustrates a view similar to FIG. 3 utilizing an alternate (tape) fastening means; and FIG. 5 illustrates a view similar to FIG. 3 showing yet another alternate (adhesive) fastening means.

DETAILED DESCRIPTION OF THE PREFERRED EMBODIMENTS

An improved vacuum device 10 in accordance with the present invention is shown most clearly in FIG. 1. The device includes a bell jar 12 having an outer wall 13 and a table 14 or other flat surface to which the bell jar can seal. A vacuum source 16 is shown which communicates with the interior of the bell jar 12. Generally, such vacuum source 16 will operate through the table 14 although of course it is possible to have the vacuum source operate through the bell jar 12.

Attached about a bottom part 18 of the bell jar 12 is an improved creep resistant sealing arrangement 20 of the present invention. The sealing arrangement 20 includes as an essential extremely important member thereof a unitary resilient elastomeric ring 22 having a J-shaped cross-section. An outer leg 24 of the ring 22 fits against the outside 26 of the bell jar 12. An inner leg 28 of the ring 22 fits against the inside 30 of the bell jar 12. A cross member 32 of the ring 22 fits against a bottom rim 33 of the bell jar 12. Means are provided for fastening the outer leg 24 radially inwardly against the outside 26 of the bell jar 12. In the embodiment illustrated in FIGS. 1, 3 and 4 the fastening means is attached externally radially of the outer leg 24 and exerts pressure inwardly radially thereon. The fastening means illustrated in FIGS. 1 and 3 comprises a metal band 34 and means, for tightening the metal band 34 about the outer leg 24.

In the embodiment illustrated in FIGS. 1 and 3 the tightening means comprises a simple clamp arrangement 36 which operates under the same general principles as a typical hose clamp.

In the embodiment illustrated in FIG. 4 the fastening means comprises tape 38 which serves as taping means for fastening the outer leg 24 of the ring 22 against the outside 26 of the bell jar 12.

In the embodiment illustrated in FIG. 5 the fastening means comprises an adhesive 40 between the outer leg 24 of the ring 22 and the outside 26 of the bell jar 12.

As is illustrated most clearly in FIGS. 1, 3, 4 and 5, the improved sealing arrangement of the present invention preferably includes a circular metal collar 42 around the bottom of the bell jar 12 which serves to strengthen the bottom rim 33. If desired, the metal collar 42 can be placed outside of the bell jar 12. It is important that the portion of the bell jar 12 which abuts the inner leg 28 of the J-shaped ring 22, whether it be the outer wall 13 or the metal collar 42 which does the abutting, extend towards the table 14. This helps to assure a leak proof continuous circular seal at the table 14.

It will be most apparent from reference to FIGS. 3, 4 and 5 that any creep of the ring 22 upwardly and away from the bottom rim 33 of the bell jar 12 is opposed by the contact of the inside 46 of the inner leg 28 of the ring 22 with the inside 30 of the bell jar 12 adjacent the bottom rim 33. Thus, even though the metal band 34 may be tightened through use of the clamp arrangement 36 sufficiently to cause some flow of the ring 22, said ring 22 will be prevented from being forced away from the bottom rim 33 of the bell jar 12 by the inner leg 28. The inner leg 28 is generally shorter than the outer leg 24 for ease of placing the ring 22 in position about the rim 33 of the bell jar 12 and very importantly, to expose as little resilient elastomeric material as possible to the vacuum system to reduce out-gassing thereof.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. In a vacuum device comprising a closed top cylindrical bell jar having an open bottom defining a planar rim, a flat surface against which said rim seats with a gasket therebetween and a vacuum source communicating with the interior of said bell jar, an improved creep resistant sealing arrangement comprising:
    a unitary resilient elastomeric continuous ring having a generally J-shaped cross-section an outer leg of which fits against the outside of said bell jar, an inner leg of which fits against the inside of said bell jar and a cross-member of which fits against the rim of said bell jar;
    means for fastening said outer leg with a radially inward force acting against the outside of the bell jar, to oppose outward creeping of said cross-member away from the bottom rim of said bell jar; said inner leg of said ring opposing creeping of said ring away from the bottom rim of said bell jar and out from under said fastening means.

2. An improved sealing arrangement as in claim 1, wherein said outer leg is longer than said inner leg.

3. An improved sealing arrangement as in claim 2, including circular metal collar means around said bottom of said jar for strengthening said rim and forming a part thereof, said collar means causing said rim to extend closer to said flat surface adjacent said inner leg than it does adjacent said outer leg.

4. An improved sealing arrangement as in claim 3, wherein said fastening means comprises an adhesive between said outer leg and the outside of said bell jar.

5. An improved sealing arrangement as in claim 3, wherein said fastening means is attached externally radially of said outer leg and exerts pressure inwardly radially thereon.

6. An improved sealing arrangement as in claim 5, wherein said fastening means comprises a metal band and means for tightening said metal band about said outer leg.

7. An improved sealing arrangement as in claim 5, wherein said fastening means comprises taping means.

* * * * *